United States Patent
Karlsson et al.

(10) Patent No.: US 9,755,532 B2
(45) Date of Patent: Sep. 5, 2017

(54) ISOLATED FLY-BUCK CONVERTER, SWITCHED MODE POWER SUPPLY, AND METHOD OF MEASURING A VOLTAGE ON A SECONDARY SIDE OF AN ISOLATED FLY-BUCK CONVERTER

(71) Applicant: Telefonaktiebolaget L M Ericsson (publ), Stockholm (SE)

(72) Inventors: Magnus Karlsson, Oskarshamn (SE); Oscar Persson, Kalmar (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 244 days.

(21) Appl. No.: 14/410,848

(22) PCT Filed: Mar. 11, 2014

(86) PCT No.: PCT/SE2014/050293
§ 371 (c)(1),
(2) Date: Dec. 23, 2014

(87) PCT Pub. No.: WO2015/137852
PCT Pub. Date: Sep. 17, 2015

(65) Prior Publication Data
US 2015/0340959 A1  Nov. 26, 2015

(51) Int. Cl.
*H02M 3/335* (2006.01)
*H02M 3/158* (2006.01)
*H02M 1/00* (2006.01)

(52) U.S. Cl.
CPC ....... *H02M 3/33569* (2013.01); *H02M 3/335* (2013.01); *H02M 3/3353* (2013.01); *H02M 3/158* (2013.01); *H02M 2001/0022* (2013.01)

(58) Field of Classification Search
CPC ......... H02M 3/33538; H02M 3/33546; H02M 3/33515; H02M 3/33576; H02M 3/33592;
(Continued)

(56) References Cited

U.S. PATENT DOCUMENTS

2011/0090724 A1   4/2011   Appelberg
2011/0227492 A1*  9/2011   Du ..................... H05B 33/0818
                                                  315/186
(Continued)

FOREIGN PATENT DOCUMENTS

WO   2012/116750 A1   9/2012
WO   2013/113354 A1   8/2013

OTHER PUBLICATIONS

International Search Report issued in corresponding International application No. PCT/SE2014/050293, dated Nov. 21, 2014.
(Continued)

*Primary Examiner* — Harry Behm
*Assistant Examiner* — Bryan R Perez
(74) *Attorney, Agent, or Firm* — Patent Portfolio Builders PLLC (57) ABSTRACT

An isolated fly-buck converter provided for converting an input voltage ($V_{in}$) to an output voltage ($V_S$) comprises (i) on a primary side, a primary winding ($X_1$) and a non-isolated buck ($C_P$) connected in series, and a pair of switches ($Q_1$, $Q_2$), wherein the switches are switchable between a forward phase, in which the primary winding and the non-isolated buck are connected to the input voltage, and a fly-buck phase, in which the primary winding and the non-isolated buck are disconnected from the input voltage and are connected to one another in a closed circuit; and (ii) on a secondary side, a secondary winding ($X_2$) coupled to the primary winding, and a first capacitive element ($C_S$) connected over the secondary winding and a first rectifying element ($D_1$) connected to the secondary winding to prevent current from being flown through the secondary winding during the forward phase, wherein the output voltage is achieved as the voltage over the first capacitive element. A supplementary circuitry is provided at the secondary side by aid of which the input voltage can be measured on the
(Continued)

secondary side, the supplementary circuitry comprising a second capacitive element ($C_F$) and a second rectifying element ($D_2$) connected in series, wherein the supplementary circuitry is connected over the second wiring such that the second rectifying element prevents current from being flown through the supplementary circuitry during the flybuck phase, wherein the sum of the voltage over the second capacitive element and the output voltage is indicative of the input voltage.

15 Claims, 4 Drawing Sheets

(58) Field of Classification Search
CPC ......... H02M 3/33553; H02M 3/33507; H02M 2001/0012; H02M 2001/0009; H02M 2003/1566; H02M 2003/1557; H02M 3/156; H02M 3/158; H02M 3/1588; H02M 3/155; H02M 3/157; H02M 3/1563; H02M 3/1582; G05F 1/575; G05F 1/56

See application file for complete search history.

(56) References Cited

U.S. PATENT DOCUMENTS

| | | | | |
|---|---|---|---|---|
| 2014/0085936 A1* | 3/2014 | Jin | ............ | H02M 1/44 363/16 |
| 2015/0103569 A1* | 4/2015 | Zhang | ............ | H02M 3/33507 363/21.16 |
| 2015/0162837 A1* | 6/2015 | Duan | ............ | H02M 3/337 363/21.14 |

OTHER PUBLICATIONS

Written Opinion of the International searching Authority issued in corresponding International application No. PCT/SE2014/050293, dated Nov. 21, 2014.

* cited by examiner

ISOLATED FLY-BUCK CONVERTER, SWITCHED MODE POWER SUPPLY, AND METHOD OF MEASURING A VOLTAGE ON A SECONDARY SIDE OF AN ISOLATED FLY-BUCK CONVERTER

TECHNICAL FIELD

The technical field relates to isolated fly-buck converters, to switched mode power supplies comprising isolated fly-buck converters, and to methods of measuring a voltage on a secondary side of an isolated fly-buck converter, which is indicative of the input voltage.

BACKGROUND

The increasing dynamic requirements, such as monotonic start-up, recovery after short-circuit, load transient performance, have led to the re-partitioning of the control circuits of many modern isolated switched mode power supplies from the primary side to the secondary side.

One problem with this control circuit, now placed on the secondary side, is that it has to be powered from the primary side and the input voltage has to be monitored accurately, since it is used in the control of the main converter.

The control circuit is often powered via a small housekeeping or auxiliary converter There are numerous of ways of designing such a housekeeping or auxiliary supply for an isolated switched mode power supply.

Fly-buck converters have been proposed, see US 2011/0090724 A1, but the high voltage isolation requirements cause problems when designing the fly-buck converter; it may be challenging to supply the primary side with regulated power.

An alternative is to use an auxiliary winding in, or tap off power from, the main converter of the isolated switched mode power supply. This requires, however, that the main switches of the main converter are switching, which causes problems during pre-bias starts and fault handling, when the output of the main converter has to be turned off, but the housekeeping power on the secondary side is necessary.

SUMMARY

It is an aim to provide an isolated fly-buck converter for a switched mode power supply, by which a reliable measurement of the input voltage can be made on the secondary side of the converter, while the problems of the prior art approaches are alleviated or at least mitigated.

A first aspect refers to an isolated fly-buck converter provided for converting an input voltage to an output voltage and comprising, on a primary side, a primary winding and a non-isolated buck, e.g. implemented as a capacitor, connected in series, and a pair of switches, wherein the switches are switchable between a forward phase, in which the primary winding and the non-isolated buck are connected to the input voltage, and a fly-buck phase, in which the primary winding and the non-isolated buck are disconnected from the input voltage, but are connected to one another in a closed circuit.

The isolated fly-buck converter comprises, on an isolated secondary side, a secondary winding coupled to the primary winding, and a first capacitive element connected over the secondary winding and a first rectifying element connected to the secondary winding to prevent current from being flown through the secondary winding during the forward phase, wherein the output voltage is achieved as the voltage over the first capacitive element.

Further, the isolated fly-buck converter comprises, on the secondary side, a supplementary circuitry by aid of which the input voltage can be measured on the secondary side. The supplementary circuitry comprises a second capacitive element and a second rectifying element connected in series, wherein the supplementary circuitry is connected over the second wiring such that the second rectifying element prevents current from being flown through the supplementary circuitry during the fly-buck phase, wherein a voltage, which is a sum of the voltage over the second capacitive element and the output voltage, is indicative of the input voltage.

By such design of an isolated fly-buck converter, accurate and reliable measures of the input voltage can be obtained on the secondary side of the converter.

Optionally, the measuring circuitry comprises a resistive element connected in series with the second capacitive element and the second rectifying element.

Hereby, the current spikes during charging of the second capacitive element are reduced and the produced voltage over the second capacitive element will be less noisy.

In one embodiment, the isolated fly-buck converter comprises a voltage divider including two serially connected resistive elements connected in parallel over the first and second capacitive elements, and a further capacitive element and a voltage reference connected in parallel over one of the resistive elements of the voltage divider, wherein a voltage over the voltage reference is usable as a hybrid regulated ratio reference.

In an alternative embodiment, the isolated fly-buck converter comprises a voltage divider including two serially connected resistive elements connected in parallel over the first and second capacitive elements, and a further capacitive element connected in parallel over one of the resistive elements of the voltage divider, wherein a voltage over the further capacitive element is usable as a regulated ratio reference.

In yet an alternative embodiment, the isolated fly-buck converter comprises a resistive element connected in parallel over the second capacitive element, via which the second capacitive element can be discharged, and a sample and hold circuit configured to sample and hold the voltage indicative of the input voltage.

A second aspect refers to a switched mode power supply comprising a main converter configured to convert the input voltage to an output voltage, a control arrangement for controlling the operation of the main converter, and the isolated fly-buck converter of the first aspect for powering the control arrangement. The isolated fly-buck converter is advantageously connected to pass to the control arrangement, the voltage indicative of the input voltage or any voltage indicative thereof, and the control arrangement is advantageously configured to control the operation of the main converter in response thereto.

For instance, the above disclosed hybrid regulated ratio reference, regulated ratio reference, or sample and hold voltage indicative of the input voltage may be used as input by the control arrangement in the control of the main converter of the switched mode power supply.

The voltage indicative of the input voltage may also be used by the control arrangement to handle input voltage transients (voltage mode feed-forward). To this end, the voltage indicative of the input voltage has to be monitored with a high dynamic bandwidth.

The main converter may be a DC-DC converter, e.g. a DC-DC voltage down-converter e.g. configured to operate with input and output voltages in the range of 10-100 V. While the design of the isolated fly-back converter of the first aspect is typically used with a converter ratio of 1:1, a main voltage down-converter would typically require lower voltages for FET transistors of the drive. Therefore, a suitable converter ratio for the isolated fly-back converter may be 1:0,75.

A third aspect refers to a base station comprising the isolated fly-buck converter of the first aspect or the switched mode power supply of the second aspect.

A fourth aspect refers to a method of measuring a voltage on a secondary side of an isolated fly-buck converter provided for converting an input voltage to an output voltage and comprising (i) on a primary side, a primary winding and a non-isolated buck connected in series, and a pair of switches, wherein the switches are switchable between a forward phase, in which the primary winding and the non-isolated buck are connected to the input voltage, and a fly-buck phase, in which the primary winding and the non-isolated buck are disconnected from the input voltage and are connected to one another in a closed circuit; and (ii) on a secondary side, a secondary winding coupled to the primary winding, and a first capacitive element connected over the secondary winding and a first rectifying element connected to the secondary winding to prevent current from being flown through the secondary winding during the forward phase, wherein the output voltage is achieved as the voltage over the first capacitive element.

According to the method a supplementary circuitry is provided on the secondary side of the isolated fly-buck converter, wherein the supplementary circuitry comprises a second capacitive element and a second rectifying element connected in series, wherein the supplementary circuitry is connected over the second wiring such that the second rectifying element prevents current from being flown through the supplementary circuitry during the fly-buck phase. A voltage, which is the sum of the voltage over the second capacitive element and the output voltage, or a voltage indicative thereof, is measured, wherein the measured voltage is indicative of the input voltage. Advantageously, the voltage indicative of the input voltage is monitored continuously and with a high dynamic bandwidth.

The measured/monitored voltage may be input to a control arrangement configured to control the operation of a main converter of a switched mode power supply in response thereto, e.g. using any of voltage forward feed, regulated ratio, or hybrid regulated ratio control.

Further characteristics and advantages will be evident from the detailed description of embodiments given hereinafter, and the accompanying FIGS. 1-6, which are given by way of illustration only.

DETAILED DESCRIPTION

Figure 1:
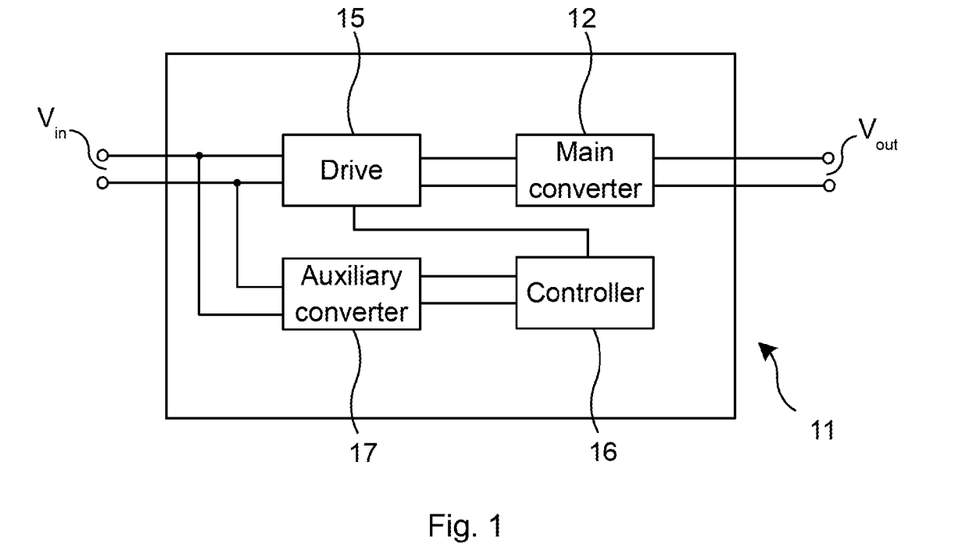
FIG. 1 illustrates, schematically, in a Nock diagram an embodiment of a switched mode power supply.

FIG. 1 illustrates, schematically, an embodiment of a switched mode power supply 11 comprising a main converter 12 for converting an input voltage $V_{in}$ to an output voltage $V_{out}$, a drive 15 for driving the converter 12, a controller 16 for controlling the drive 15 and thus the operation of the main converter 12, and a housekeeping or auxiliary converter 17 for down converting the input voltage $V_{in}$ to a voltage suitable for the controller 16, such that the controller 16 can be powered by the input voltage $V_{in}$.

The main converter 12 is an isolated DC-DC converter, typically down-converting the input voltage $V_{in}$ to a suitable output power $V_{out}$. The main converter 12 may typically operate with input $V_{in}$ and output $V_{out}$ voltages in the range of 10-100 V.

The auxiliary converter 17 is an isolated fly-buck converter with a non-insulated buck and embodiments thereof will be further detailed below with reference to FIGS. 3-5.

Figure 2:
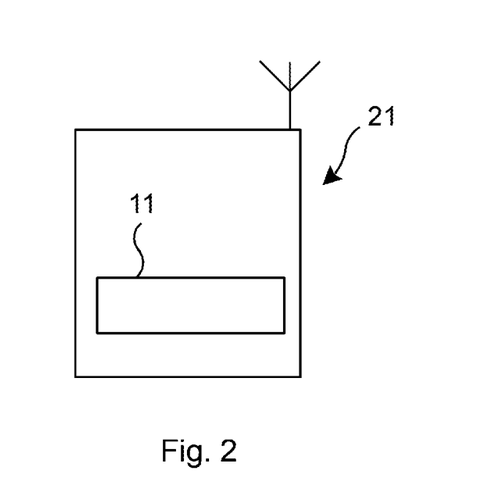
FIG. 2 illustrates, schematically, an embodiment of a base station comprising one or more of the switched mode power supply of FIG. 1.

FIG. 2 illustrates, schematically, an embodiment of a base station 21 comprising one or more of the switched mode power supply ii of FIG. 1.

Figure 3:
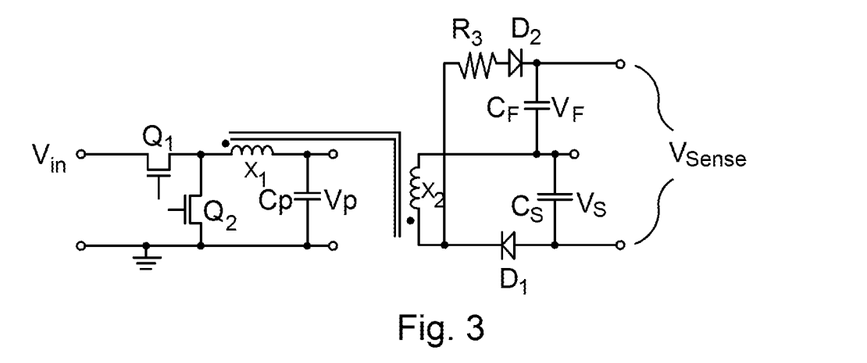
FIG. 3 illustrates, schematically, in a circuit diagram, an embodiment of an isolated fly-buck converter, which can be used in the switched mode power supply of FIG. 1.

FIG. 3 illustrates, schematically, in a circuit diagram, an embodiment of an isolated fly-buck converter, which can be used in the switched mode power supply of FIG. 1.

The fly-buck converter is configured to convert the input voltage $V_{in}$ to an output voltage $V_S$ and comprises a primary winding $X_1$, a non-isolated buck $C_P$, and a pair of switches $Q_1$, $Q_2$ on a primary side, and a secondary winding $X_2$, a first capacitive element $C_S$, and a first rectifying element $D_1$ on a secondary side.

The non-isolated buck $C_P$, e.g. implemented as a capacitor, is connected in series with the primary winding $X_1$ and the pair of switches $Q_1$, $Q_2$ are operable to switch between a forward phase, in which the primary winding $X_1$ and the non-isolated buck $C_P$ are connected to the input voltage $V_{in}$, and a fly-buck phase, in which the primary winding $X_1$ and the non-isolated buck $C_P$ are disconnected from the input voltage $V_{in}$, but are connected to one another in a closed circuit. The switching of the switches $Q_1$, $Q_2$ may be controlled by a simple integrated circuit (not illustrated).

The secondary winding $X_2$ is electromagnetically coupled to the primary winding $X_1$, and the first capacitive element $C_S$, e.g. implemented as a capacitor, is connected over the secondary winding $X_2$ and the first rectifying element $D_1$, e.g. implemented as a diode, is connected to the secondary winding $X_2$ to prevent current from being flown through the secondary winding $X_2$ during the forward phase. The output voltage $V_s$ is achieved as the voltage over the first capacitive element $C_S$.

In order to be able to measure the input voltage $V_{in}$ on the isolated secondary side, a supplementary circuitry is provided. The supplementary circuitry comprises a second capacitive element $C_F$, e.g. implemented as a capacitor, and a second rectifying element $D_2$, e.g. implemented as a diode, connected in series, wherein the supplementary circuitry is connected over the second wiring $X_2$ such that the second rectifying element $D_2$ prevents current from being flown through the supplementary circuitry during the fly-buck phase, wherein the sum of the voltage $V_F$ over the second capacitive element and the output voltage $V_S$ is a sensed measure $V_{sense}$ on the isolated secondary side indicative of the input voltage $V_{in}$ on the primary side. The measuring circuitry may comprise a resistive element $R_3$ connected in series with the second capacitive element $C_F$ and the second rectifying element $D_2$, the purpose of which being to reduce the current spikes during charging of the second capacitive element $C_F$, thereby producing a less noisy voltage over second capacitive element $C_F$.

The relation between the sensed voltage $V_{sense}$ and the input voltage $V_{in}$ will be derived below for a fly-buck converter as of above, wherein the primary winding $X_1$ has one winding and the secondary winding $X_2$ has n windings. Steady state switching with a duty cycle D, small ripple current in the inductors, and small voltage ripple in the capacitors are assumed.

Figure 4A:
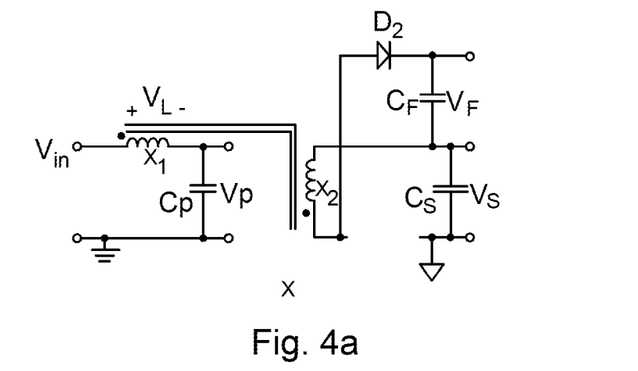
FIGS. 4a-b are simplified and schematic circuit diagrams of the isolated fly-buck converter of FIG. 3 in forward and fly-buck modes, respectively.
Figure 4B:
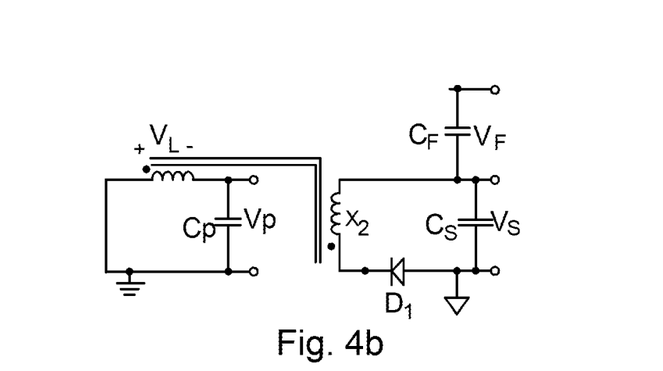

During the forward phase, wherein the switch $Q_1$ is conducting and the switch $Q_2$ is off, the fly-buck converter of FIG. 3 can be simplified to the circuit diagram shown in FIG. 4a, since the rectifying element $D_1$ becomes non-conducting. The resistive element $R_3$ is removed for simplicity during the analysis.

The voltage over the inductor can be stated directly on the primary side as $$V_L = V_{in} - V_P \qquad \text{Equation 1}$$

Or, using the reflected voltage over the second capacitive element $V_F$ on the primary side $$V_L = \frac{V_F + V_D}{n} \qquad \text{Equation 2}$$

where $V_D$ is the voltage drop over the diode $D_2$ in the forward direction. During the fly-buck phase, the fly-buck converter of FIG. 3 can be simplified to the circuit diagram shown in FIG. 4b.

The voltage over the primary winding can be stated directly on the primary side as $$V_L = -V_P \qquad \text{Equation 3}$$

Or, using the reflected output voltage $V_S$ on the primary side $$V_L = -\frac{V_S + V_D}{n} \qquad \text{Equation 4}$$

where $V_D$ is the voltage drop over the diode Di in the forward direction.

For the non-isolated buck $V_P$, the volt-second balance using Equations 1 and 3 becomes $$D(V_{in} - V_P) + D'(-V_P) = 0 \qquad \text{Equation 5}$$

where the forward phase duration is equal to the duty cycle D, and the fly-buck duration is $(1-D)=D'$. Solving Equation 5 for $V_P$ yields $$V_P = D V_{in} \qquad \text{Equation 6}$$

For the isolated fly-buck, the volt-second balance using Equations 1 and 4 becomes $$D(V_{in} - V_P) + D'\left(-\frac{V_S + V_D}{n}\right) = 0 \qquad \text{Equation 7}$$

Collecting terms on each sides yields $$D V_{in} = D V_P + D' \frac{V_S + V_D}{n}$$

and using Equation 6 yields $$V_P = D V_P + D' \frac{V_S + V_D}{n}$$

Collecting $V_P$ on the left hand side and using $(1-D)=D'$ yield $$D' V_P = D' \frac{V_S + V_D}{n}$$

Dividing this with D' on both sides and solving for $V_S$ yields $$V_S = n V_P - V_D \qquad \text{Equation 8}$$

For the isolated forward-buck, the volt-second balance using Equations 2 and 3 becomes $$D \frac{V_F + V_D}{n} + D'(-V_P) = 0 \qquad \text{Equation 9}$$

Solving Equation 1 for $D'(-V_P)$ and replacing in Equation 9 yields $$D \frac{V_F + V_D}{n} - D(V_{in} - V_P) = 0$$

Solving for $V_F$ yields $$V_F = n(V_{in} - V_P) - V_D \qquad \text{Equation 10}$$

The sensed voltage $V_{sense}$ indicative of the input voltage $V_{in}$ is the sum of the voltages $V_S$ and $V_F$, and using Equations 8 and 10 yields
$V_{sense} = V_S + V_F = n V_P - V_D + n(V_{in} - V_P) - V_D$ and collecting terms yields $$V_{sense} = n V_{in} - 2 V_D \qquad \text{Equation 11}$$

Hence, the sensed voltage is linear with the input voltage $V_{in}$ and offset by two diode forward voltages $V_D$. Since the input voltage $V_{in}$ times the ratio is $n V_{in} \gg 2 V_D$ Equation 11 can be simplified to $$V_{sense} \approx n V_{in} \qquad \text{Equation 12}$$

The diode voltage drops can be reduced using Schottky diodes or can even be eliminated by using synchronous rectification.

The sensed voltage $V_{sense}$ indicative of the input voltage $V_{in}$ and sensed on the isolated secondary side can be used in the control of the main converter 12 of the switched mode power supply 11.

The controller 16 of the switched mode power supply 11 may thus be configured to receive the sensed voltage $V_{sense}$, or a voltage indicative thereof, from the isolated secondary side of the auxiliary converter 11, i.e. the fly-buck converter, and to control the drive 15 and thus the operation of the main converter 12 in response to the sensed voltage $V_{sense}$, or the voltage indicative thereof.

Various approaches may be considered. The sensed voltage $V_{sense}$, or the voltage indicative thereof, as measured on the secondary side may be used for voltage feed-forward control in a secondary side controlled switched mode power supply.

Alternatively, or additionally, the sensed voltage $V_{sense}$, or the measure indicative thereof, may be used for setting the reference voltage in a regulated ratio or hybrid regulated ratio controlled switched mode power supply. Such switched mode power supplies are disclosed in detail in WO 2012/116750 A1 and WO 2013/113354 A1.

Figure 5A:
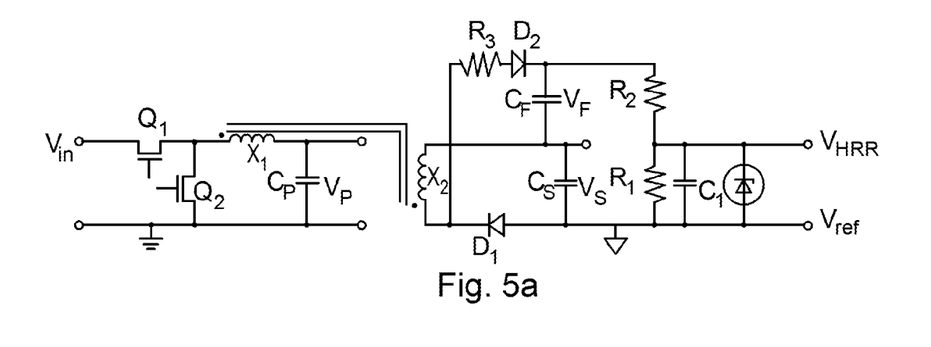
FIGS. 5a-c illustrate each, schematically, in a circuit diagram, a respective embodiment of an isolated fly-buck converter, which can be used in the switched mode power supply of FIG. 1.

FIG. 5a illustrates, schematically, in a circuit diagram, an embodiment of an isolated fly-buck converter, which can be used for hybrid regulated ratio control in the switched mode power supply of FIG. 1.

The isolated fly-buck converter comprises, on the secondary side, a voltage divider including two serially connected resistive elements $R_1$, $R_2$ connected in parallel over the first and second capacitive elements $C_S$, $C_F$ to divide the sensed voltage $V_{sense}$. A fourth capacitive element $C_1$, e.g. implemented as a capacitor, adding a time constant and a voltage reference $V_{ref}$ are connected in parallel over one of the resistive elements $R_1$ of the voltage divider, wherein a voltage $V_{HRR}$ over the voltage reference $V_{ref}$ is usable as a hybrid regulated ratio reference in hybrid regulated ratio control of the main converter 12.

In FIG. 5a, the voltage $v_{sense} \approx nV_{in}$ is divided using a resistive divider $R_1$, $R_2$ and a time constant is added by using the capacitor $C_1$. The reference voltage is saturated using a high precision voltage reference $V_{ref}$, yielding the reference voltage for hybrid regulated ratio as $$V_{HRR} = \min\left\{\frac{R_1}{R_1+R_2} \cdot \frac{1}{1+sC_1\frac{R_1R_2}{R_1+R_2}} nV_{in}, V_{ref}\right\},$$

where the regulated ratio input voltage part has the gain of $$G_{RR} = \frac{R_1}{R_1+R_2} \cdot n$$

and the time constant becomes $$\tau_{RR} = C_1 \frac{R_1R_2}{R_1+R_2}.$$

Figure 5B:
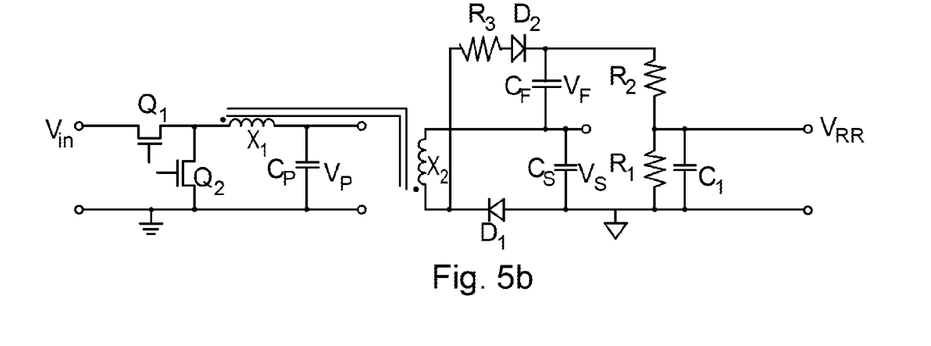

FIG. 5b illustrates, schematically, in a circuit diagram, an embodiment of an isolated fly-buck converter, which can be used for regulated ratio control in the switched mode power supply of FIG. 1.

The isolated fly-buck converter is identical with the isolated fly-buck converter of FIG. 5a except for that it lacks the voltage reference $V_{ref}$. A voltage $V_{RR}$ over the fourth capacitive element $C_1$ is usable as a regulated ratio reference in regulated ratio control of the main converter 12.

Figure 5C:
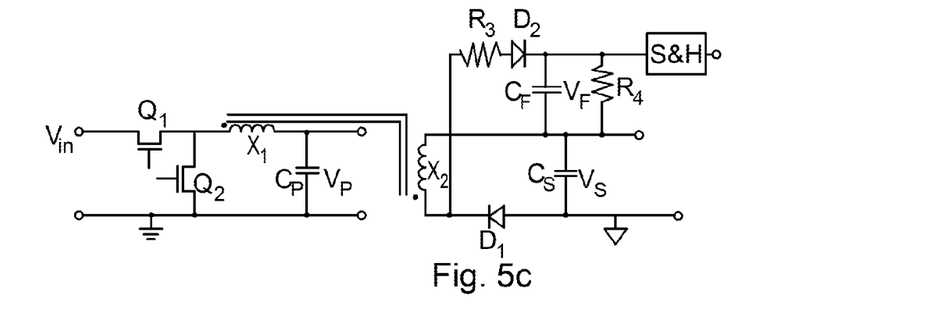

FIG. 5c illustrates, schematically, in a circuit diagram, an embodiment of an isolated fly-buck converter, which can be used for control in the switched mode power supply of FIG. 1.

The isolated fly-buck converter comprises a resistive element $R_4$ connected in parallel over the second capacitive element $C_F$, via which the second capacitive element $C_F$ can be discharged, and a sample and hold circuit S&H configured to sample and hold the voltage indicative of the input voltage.

Figure 6:
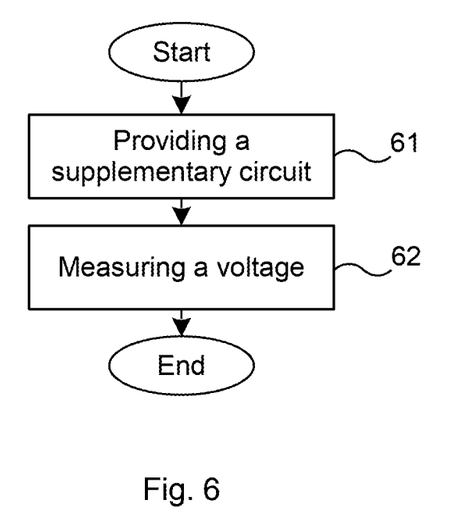
FIG. 6 is a schematic flow scheme of an embodiment of measuring a voltage on a secondary side of an isolated fly-buck converter, which is indicative of an input voltage on a primary side of the isolated fly-buck converter.

FIG. 6 is a schematic flow scheme of an embodiment of measuring a voltage on a secondary side of an isolated fly-buck converter, which is indicative of an input voltage on a primary side of the isolated fly-buck converter.

The isolated fly-buck converter comprises (i) on a primary side, a primary winding and a non-isolated buck connected in series, and a pair of switches, wherein the switches are switchable between a forward phase, in which the primary winding and the non-isolated buck are connected to the input voltage, and a fly-buck phase, in which the primary winding and the non-isolated buck are disconnected from the input voltage and are connected to one another in a closed circuit; and (ii) on a secondary side, a secondary winding coupled to the primary winding, and a first capacitive element connected over the secondary winding and a first rectifying element connected to the secondary winding to prevent current from being flown through the secondary winding during the forward phase, wherein the output voltage is achieved as the voltage over the first capacitive element.

According to the method, a supplementary circuitry is, in a step 61, provided on the secondary side, wherein the supplementary circuitry comprises a second capacitive element and a second rectifying element connected in series, wherein the supplementary circuitry is connected over the second wiring such that the second rectifying element prevents current from being flown through the supplementary circuitry during the fly-buck phase. A voltage, which is the sum of the voltage over the second capacitive element and the output voltage, or any voltage indicative thereof, is, in a step 62, measured, wherein the measured voltage is indicative of the input voltage. The voltage indicative of the input voltage may be measured continuously in order to track any deviations or transients.

The measured voltage may be input to a control arrangement configured to control the operation of a main converter of a switched mode power supply in response thereto, e.g. using any voltage forward feed, regulated ratio, or hybrid regulated ratio control.

It shall be appreciated by a person skilled in the art that the embodiments disclosed herein are merely example embodiments, and that any details and measures are purely given as examples only.

The invention claimed is:

1. An isolated fly-buck converter provided for converting an input voltage to an output voltage and comprising:
   on a primary side, a primary winding and a non-isolated buck connected in series, and a pair of switches, wherein the switches are switchable between a forward phase, in which the primary winding and the non-isolated buck are connected to the input voltage, and a fly-buck phase, in which the primary winding and the non-isolated buck are disconnected from the input voltage and are connected to one another in a closed circuit; and
   on a secondary side, a secondary winding coupled to the primary winding, and a first capacitive element connected over the secondary winding and a first rectifying element connected to the secondary winding to prevent current from being flown through the secondary winding during the forward phase, wherein the output voltage is achieved as the voltage over the first capacitive element, wherein the isolated fly-buck converter comprises:

on the secondary side, a supplementary circuitry by aid of which the input voltage can be measured on the secondary side, the supplementary circuitry comprising a second capacitive element and a second rectifying element connected in series, wherein the supplementary circuitry is connected in parallel across the secondary winding such that the second rectifying element prevents current from being flown through the supplementary circuitry during the fly-buck phase, wherein a voltage, which is a sum of the voltage over the second capacitive element and the output voltage, is indicative of the input voltage.

2. The isolated fly-buck converter of claim 1 wherein said supplementary circuitry comprises a resistive element connected in series with the second capacitive element and the second rectifying element.

3. The isolated fly-buck converter of claim 1 wherein the non-isolated buck comprises a third capacitive element.

4. The isolated fly-buck converter of claim 1 comprising a voltage divider including two serially connected resistive elements connected in parallel over the first and second capacitive elements, and a fourth capacitive element and a voltage reference connected in parallel over one of the resistive elements of the voltage divider, wherein a voltage over the voltage reference is usable as a hybrid regulated ratio reference.

5. The isolated fly-buck converter of claim 1 comprising a voltage divider including two serially connected resistive elements connected in parallel over the first and second capacitive elements, and a fourth capacitive element connected in parallel over one of the resistive elements of the voltage divider, wherein a voltage over the fourth capacitive element is usable as a regulated ratio reference.

6. The isolated fly-buck converter of claim 1 comprising a resistive element connected in parallel over the second capacitive element, via which the second capacitive element can be discharged, and a sample and hold circuit configured to sample and hold the voltage indicative of the input voltage.

7. A switched mode power supply comprising a main converter configured to convert an input voltage to an output voltage, a control arrangement for controlling the operation of the main converter, and the isolated fly-buck converter of claim 1 for powering said control arrangement.

8. The switched mode power supply of claim 7 wherein the isolated fly-buck converter is connected to pass to the control arrangement, the voltage indicative of the input voltage or a voltage indicative thereof, and the control arrangement is configured to control the operation of the main converter in response thereto.

9. The switched mode power supply of claim 7 wherein main converter is a DC-DC converter.

10. The switched mode power supply of claim 7 wherein the main converter is configured to operate with input and output voltages in the range of 10-100 V.

11. A base station comprising the isolated fly-buck converter of claim 1.

12. A method of measuring a voltage on a secondary side of an isolated fly-buck converter provided for converting an input voltage to an output voltage and comprising (i) on a primary side, a primary winding and a non-isolated buck connected in series, and a pair of switches, wherein the switches are switchable between a forward phase, in which the primary winding and the non-isolated buck are connected to the input voltage, and a fly-buck phase, in which the primary winding and the non-isolated buck are disconnected from the input voltage and are connected to one another in a closed circuit; and (ii) on a secondary side, a secondary winding coupled to the primary winding, and a first capacitive element connected over the secondary winding and a first rectifying element connected to the secondary winding to prevent current from being flown through the secondary winding during the forward phase, wherein the output voltage is achieved as the voltage over the first capacitive element, wherein the steps of:

providing on the secondary side, a supplementary circuitry comprising a second capacitive element and a second rectifying element connected in series, wherein the supplementary circuitry is connected in parallel across the secondary winding such that the second rectifying element prevents current from being flown through the supplementary circuitry during the fly-buck phase;

measuring a voltage, which is the sum of the voltage over the second capacitive element and the output voltage, or a voltage indicative thereof, wherein the measured voltage is indicative of the input voltage.

13. The method of claim 12 wherein said supplementary circuitry comprises a resistive element connected in series with the second capacitive element and the second rectifying element.

14. The method of claim 12, wherein said measured voltage is input to a control arrangement configured to control the operation of a main converter of a switched mode power supply in response thereto.

15. The method of claim 14 wherein said measured voltage is input to a control arrangement configured to control the operation of the main converter of the switched mode power supply using any of voltage forward feed, regulated ratio, or hybrid regulated ratio control.

* * * * *